United States Patent
Martin et al.

(10) Patent No.: US 7,480,837 B2
(45) Date of Patent: Jan. 20, 2009

(54) METHOD OF MONITORING TIMEOUT CONDITIONS AND DEVICE THEREFOR

(75) Inventors: Harold M. Martin, Austin, TX (US);
Thang Q. Nguyen, Austin, TX (US);
Gus P. Ikonomopoulos, Lakeway, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 622 days.

(21) Appl. No.: 11/142,639

(22) Filed: Jun. 1, 2005

(65) Prior Publication Data

US 2006/0277447 A1    Dec. 7, 2006

(51) Int. Cl.
*G06F 11/30* (2006.01)

(52) U.S. Cl. .......................... 714/55; 714/15

(58) Field of Classification Search ................ 714/55, 714/15, 16–20
See application file for complete search history.

(56) References Cited

U.S. PATENT DOCUMENTS

| | | | | |
|---|---|---|---|---|
| 5,012,435 | A | * | 4/1991 | Bailey et al. .............. 714/55 |
| 5,287,362 | A | * | 2/1994 | Liencres ................... 714/55 |
| 5,460,093 | A | * | 10/1995 | Prinz et al. ................ 102/217 |
| 5,619,687 | A | | 4/1997 | Langan |
| 5,838,932 | A | * | 11/1998 | Alzien ..................... 710/314 |
| 5,864,663 | A | * | 1/1999 | Stolan ...................... 714/55 |
| 5,875,119 | A | * | 2/1999 | Bauman et al. ............ 702/181 |
| 5,974,569 | A | * | 10/1999 | Nickles .................... 714/38 |
| 6,144,676 | A | * | 11/2000 | Hamalainen et al. ........ 370/528 |
| 6,173,339 | B1 | * | 1/2001 | Yorimitsu .................. 710/5 |
| 6,571,270 | B1 | | 5/2003 | Lai |
| 6,643,734 | B2 | * | 11/2003 | Mabuchi et al. ............ 711/114 |
| 6,651,180 | B1 | | 11/2003 | Wickeraad |
| 2002/0069377 | A1 | * | 6/2002 | Mabuchi et al. ............ 714/42 |
| 2003/0037294 | A1 | * | 2/2003 | Robsman et al. ........... 714/55 |
| 2003/0204792 | A1 | * | 10/2003 | Cahill et al. ............... 714/55 |
| 2003/0225988 | A1 | * | 12/2003 | Ralphs .................... 711/167 |
| 2004/0151129 | A1 | * | 8/2004 | Kun-Szabo et al. ......... 370/254 |
| 2004/0237006 | A1 | * | 11/2004 | Adkisson et al. ........... 714/55 |
| 2005/0086392 | A1 | * | 4/2005 | Corley .................... 710/1 |

FOREIGN PATENT DOCUMENTS

JP    04279940 A * 10/1992

OTHER PUBLICATIONS

Freescale Semiconductor, Inc., "M68HC11 Reference Manual: M68HC11 Microcontrollers, "M68HC11RM/D Rev. 6, www.motorola.com/semiconductors, pp. 367-442.*

* cited by examiner

*Primary Examiner*—Gabriel L. Chu
*Assistant Examiner*—Chae Ko

(57) ABSTRACT

A maximum timeout time for a communication between devices is determined. A time period is determined for a plurality of time zones based upon the maximum timeout time. A current time zone is updated every time period. A timeout zone for an outstanding transaction is associated with a first time zone to indicate when the outstanding transaction will timeout if not completed. In one embodiment, the time period for each time zone is approximately equal to the maximum timeout period divided by a predetermined number of time zones, which may be the total number of time zones, e.g. eight or sixteen.

19 Claims, 8 Drawing Sheets

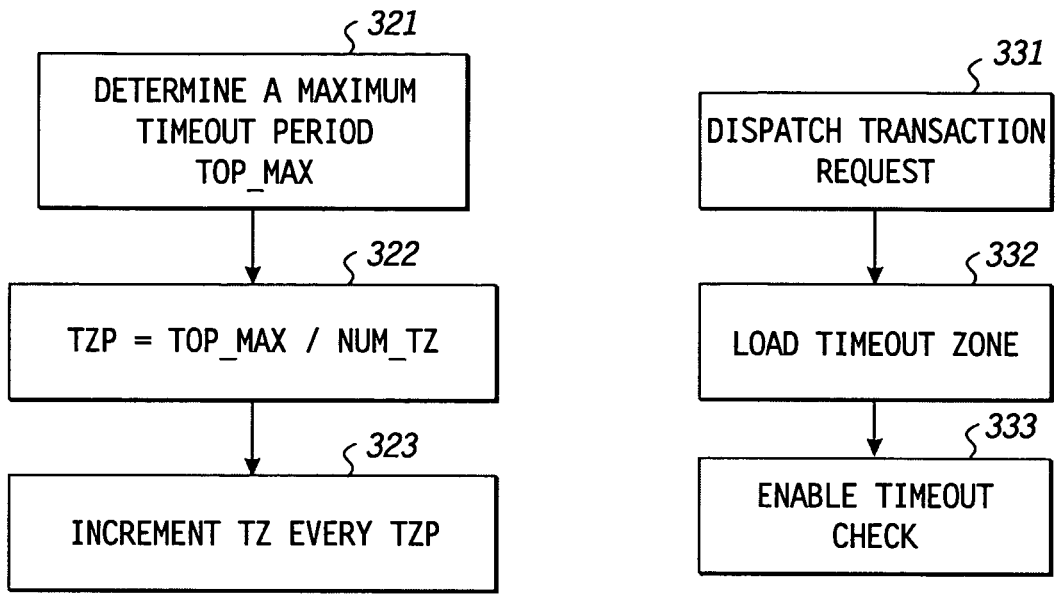
*FIG. 5*          *FIG. 6*
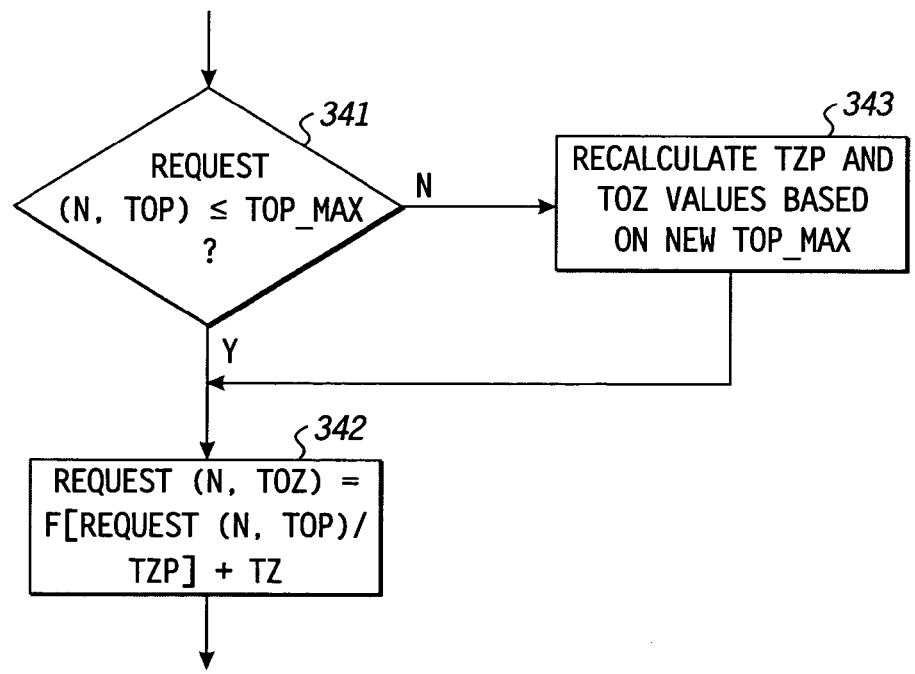
*FIG. 7*

METHOD OF MONITORING TIMEOUT CONDITIONS AND DEVICE THEREFOR

BACKGROUND

1. Field of the Disclosure

The present disclosure relates generally to data processing, and more particularly to data processing related to the transfer of information.

2. Description of the Related Art

The need to communicate between electronic devices using predefined communications standards is well understood. It is a common communication standard practice to specify a timeout requirement for completion of a transaction request to allow systems and their applications to determine if a request has failed. A timeout condition is said to have occurred, thereby indicating a transmission failure, when an amount of time allowed for a transmission to complete has passed. A requesting device or application can avoid stalling by taking corrective action once a timeout condition is detected.

Timeout conditions are detected in known devices by loading a counter with a value representative the timeout time at which a timeout condition will occur. For example, a countdown counter is loaded with a value that is decremented until a value of zero is reached, at which time a timeout condition is indicated. Systems that support multiple outstanding transactions provide a counter for each possible outstanding transaction. However, as devices become more sophisticated the cost associated with providing a large number of timeout counters capable of monitoring timeout conditions for a corresponding number of outstanding transactions has increased. This increase in cost occurs in terms of both silicon area and power consumption.

Therefore, a method and device capable of reducing this cost would be useful.

BRIEF DESCRIPTION OF THE DRAWINGS

The present disclosure may be better understood, and its numerous features and advantages made apparent to those skilled in the art by referencing the accompanying drawings.

FIGS. 4-9 are flow diagrams of methods in accordance with specific embodiments of the present disclosure.

The use of the same reference symbols in different drawings indicates similar or identical items.

DESCRIPTION OF THE DRAWINGS

A maximum timeout time for a communication between devices is determined. A time period is determined for a plurality of time zones based upon the maximum timeout time. A current time zone is updated every time period. A timeout zone for an outstanding transaction is associated with a first time zone to indicate when the outstanding transaction will timeout if not completed. In one embodiment, the time period for each time zone is approximately equal to the maximum timeout period divided by a predetermined number of time zones, which may be the total number of time zones, e.g. eight or sixteen.

In another embodiment, the time period of the time zones is approximately equal to a greatest common denominator of a first and second time zone. Multiple transactions can be dispatched during a common time zone having timeout zones that are the same. Multiple transactions can be dispatched during a common time zone having timeout zones that are different. Each transaction can have a transaction type indicating a predefined value used to determine a timeout zone for a transaction.

Figure 1:
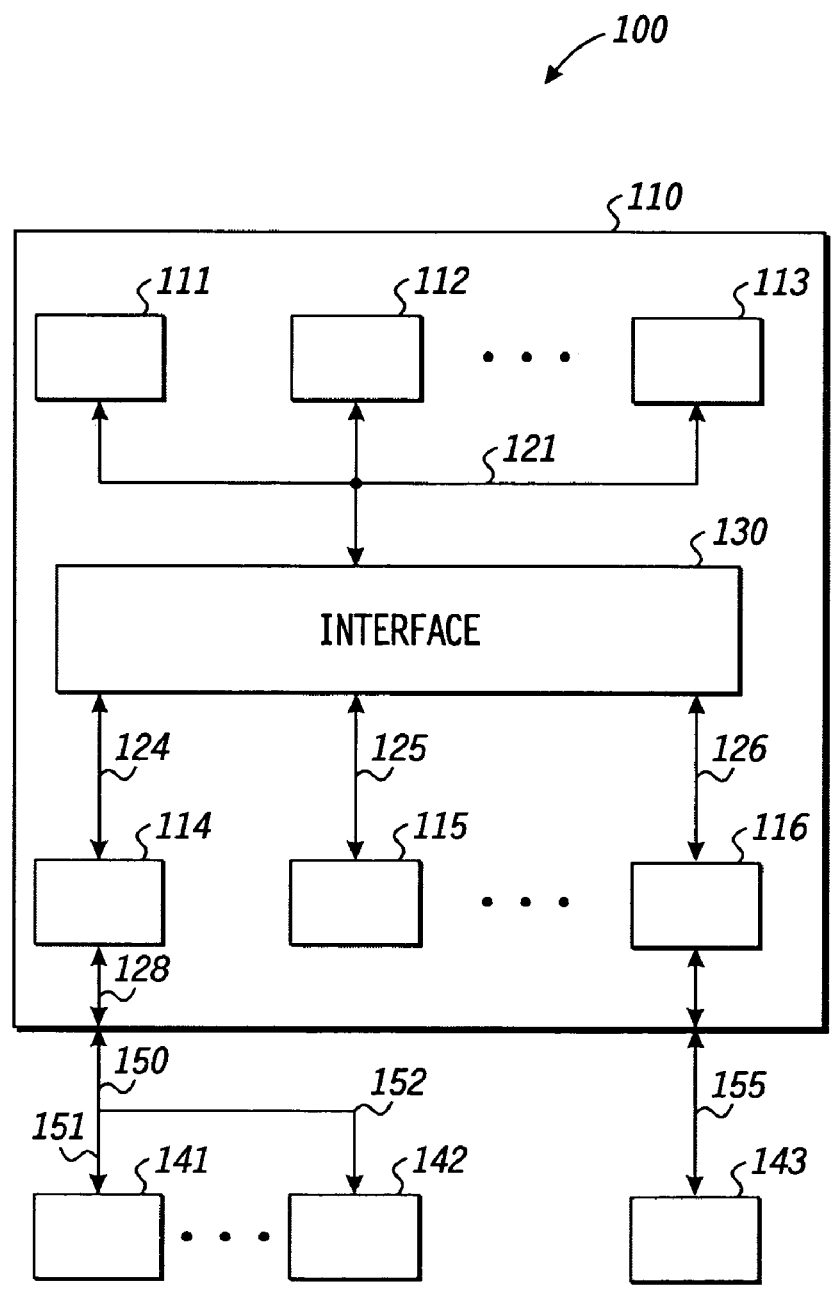
FIG. 1 illustrates a system in block diagram form in accordance with a specific embodiment to the present disclosure.

FIG. 1 illustrates a system 100 in accordance with a specific embodiment of the present disclosure. Specifically, FIG. 100 includes electronic devices 110, 141, 142, 143, and a transmission media that is illustrated as bus 150. Electronic device 110 represents a monolithic integrated circuit that includes a plurality of devices, also referred to as modules, disposed thereon. In the specific embodiment illustrated, device 110 includes an interface module 130 that is connected to each of modules 111-116. Interface module 130 is a fabric interconnect, such as a cross-point switch, that facilitates communications between modules 111-116. Modules 111-113 are connected to interface module 130 through a shared bus 121, while modules 114-116 are individually connected to interface module 130 through separate dedicated busses 124-126, respectively. It will be appreciated, that the specific buses illustrated with respect to FIG. 1 are exemplary, and that other buses and bus types, including additional bridging and interface modules, can be implemented.

Each one of the modules 111-116 is either a requesting device or a responding device. The term requesting device is used to indicate a device that can initiate a transaction request through interface module 130 to one of the other modules of device 110. The term responding device is used to indicate a device that cannot initiate requests to other devices of device 110 through interface module 130, but instead can only respond to requests received from interface module 130 on behalf of another device. Note that a responding device may provide information to interface module 130 in the same manner as requesting devices, but only in response to a request from a requesting device for the information. For purposes of discussion transaction requests are discussed herein.

In operation, to facilitate communication with one or more devices 141-142 via bus 150, module 114 acts as a bridge between bus 124 and bus 150. Similarly, module 116 acts as a bridge between bus 126 and bus 155. The term bridge is used herein to indicate a device that acts as an intermediary between different communications protocols. Typically, the different communications protocols are bus specific protocols. For purposes of discussion, it is presumed that bus 150 is a PCI Express® bus that requires connected devices to communicate over bus 150 in a manner that is compliant with the PCI Express® standard. It will be appreciated, however, that bus 150 can represent other bus standards. It will further be appreciated with respect to the PCI Express® standard, that bus 150 is referred to as a PCI express link that includes a plurality of lanes, whereby each lane of the link 150 is a dedicated point-to-point connection between device 110 and one of the plurality of devices 141-142. Bus 155 is representative of a bus standard other than PCI Express®.

Module 114 can initiate transaction requests to other modules of device 110 and to devices 141 and 142. For purposes of discussion, device 141 is considered a requesting device that can initiate transaction requests for device 110, while device 142 is considered a responding device that cannot initiate requests for device 110, but can respond to requests initiated by device 110.

Bridge module 114 is responsible for controlling transactions between device 110 and the PCI Express® link 150. In accordance with a specific embodiment, module 114 uses time zones to facilitate monitoring timeout conditions for each transaction. The use of time zones will be better understood with respect to FIGS. 2-11 for purposes of discussion herewith.

In operation, bridge module 114 maintains a current time zone that is used to facilitate determining when a transaction timeout occurs. As illustrated in the timing diagram of FIG. 2, a current time zone, labeled TZ, is incremented in a modulo manner each time a pulse is asserted on signal TZ_INC. In the specific implementation, TZ transitions between time zone 0 to time zone 7 in a modulo manner, and therefore can be represented by three bits. Note that additional numbers of time zones can be implemented, such as 16 time zones using 4-bits, or more time zones as needed. The use of small counters to track time zones is advantageous in that it reduces power and area needed to perform timeout tracking. The period of each time zone is referred as a Time Zone Period (TZP) in FIG. 2.

When a transaction is dispatched from device 110, a future time zone will be associated with the transaction to indicate a timeout zone (TOZ) of the transaction. The timeout zone identifies a time zone by which the transaction request is to be completed. A timeout condition for an outstanding request occurs when the current time zone matches the timeout zone of an outstanding request. Note that the amount of time associated with an entire set of timeout values, e.g. from time zones 0 through 7, represents a maximum timeout period that can be monitored by comparison of a current time zone to a timeout zone. The maximum timeout period is represented in FIG. 2 as TOP_MAX.

Figure 2:
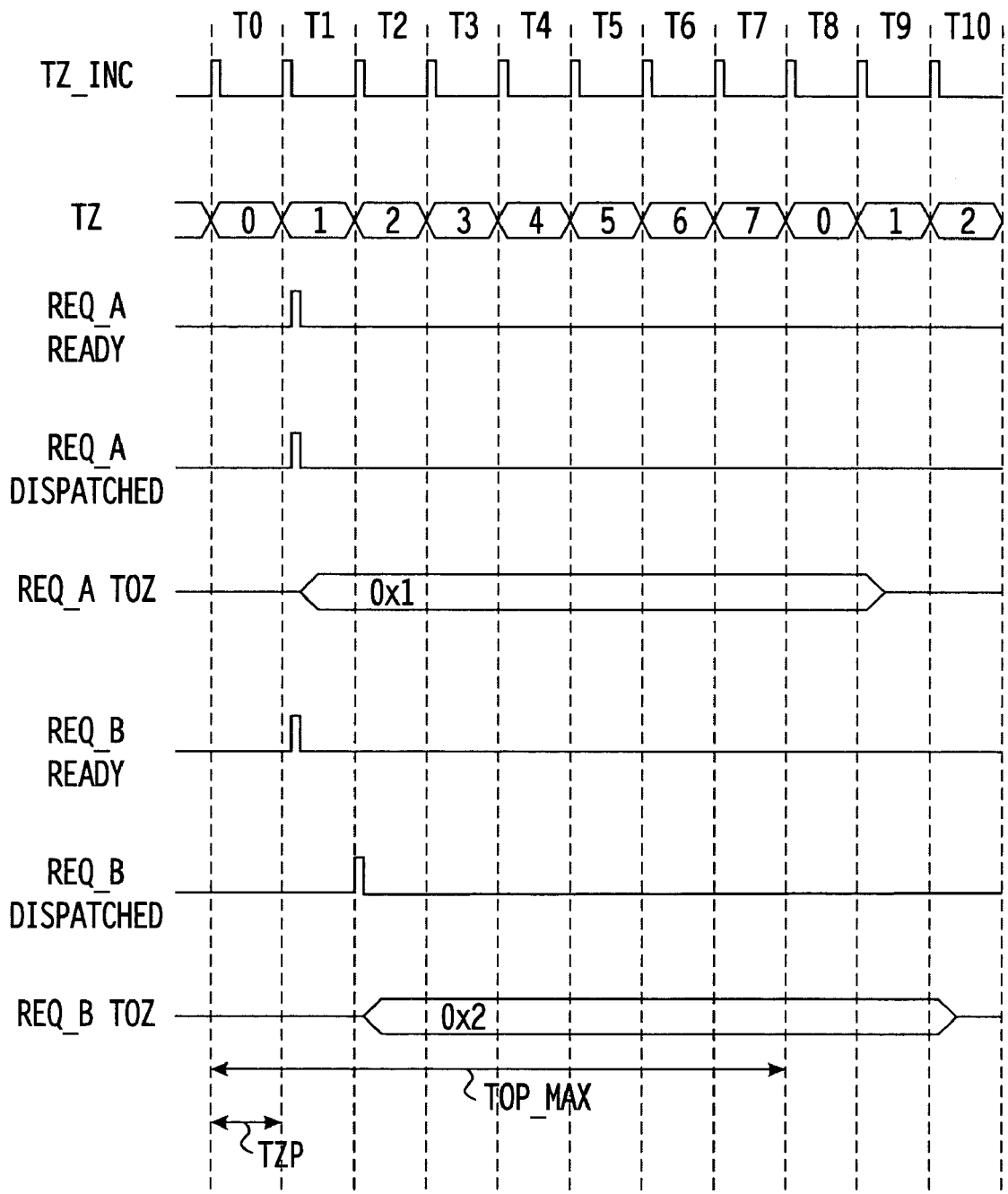
FIG. 2 illustrates a timing diagram indicating relationships amongst signals in accordance to the present disclosure.

In timing diagram of FIG. 2, a signal labeled REQ_A READY indicates when information associated with a request identified as "REQ_A" has been received at bridge module 114 and is ready to be dispatched to link 150. In accordance with the specific embodiment, a transaction's readiness for dispatch occurs asynchronously to time zone transitions. As illustrated, a pulse is asserted during time period T1, which corresponds to time zone 1, to indicate that a transaction REQ_A is ready to be dispatched to link 150. The signal labeled REQ_A DISPATCHED indicates that REQ_A was dispatched substantially simultaneously with REQ_A being identified as ready for dispatch, as indicated by the asserted pulse within time zone 1. Assuming REQ_A has a timeout period equal to TOP_MAX, the next occurrence of time zone 1 will be the timeout zone associated with REQ_A. As such, REQ_A will timeout if transaction REQ_A is not completed before time zone 1 becomes the current time zone at time T9. A timeout indicator will be asserted if a timeout of REQ_A occurs so that appropriate timeout management actions can occur.

Figure 3:
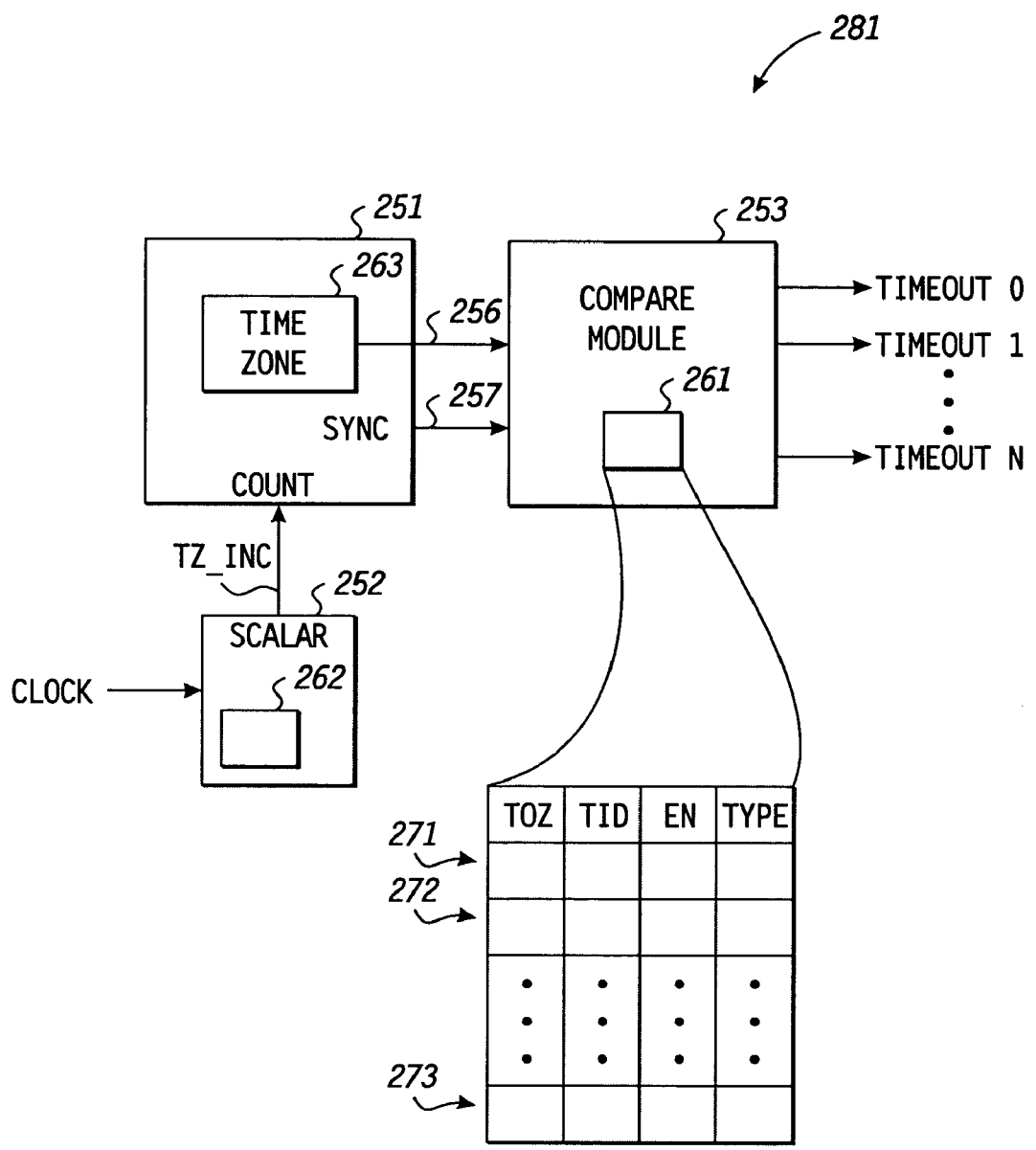
FIG. 3 illustrates a block diagram providing greater detail for a portion of the system of FIG. 1.

FIG. 3 illustrates a block diagram of portions of bridge module 114 used to perform timeout monitoring for outstanding transactions. A clock scalar 252 controls the period of each time zone by scaling a received clock, such as a system clock of device 110, by a predefined amount to generate a periodic series of pulses on signal TZ_INC. In one embodiment, a period between asserted pulses of TZ_INC is defined by a count value stored at location 262. For example, location 262 can be a register storing a value indicating a number of system clock cycles that occur between asserted pulses of TZ_INC. Signal TZ_INC is received by time zone counter 251 and is used to increment the current time zone maintained at time zone storage location 263 in a modulo manner.

Compare module 253 of FIG. 3 includes storage location 261 that includes a plurality of register sets 271-273 for storing information associated with outstanding transaction requests. In accordance with a specific embodiment, each of the register sets store a timeout zone indicator (TOZ), a transaction identifier (TID) that is included with information transfers to allow tracking information transfers associated with REQ_A, an enable indicator (EN) that is asserted to indicate an transaction is outstanding, and a transaction type (TYPE) that can be used to determine a timeout period of a request.

A timeout condition occurs in the present embodiment when a timeout zone stored in an enabled register set matches the time zone maintained by counter 251. In response to a match occurring, an output from compare module 253 will be asserted to indicate that a timeout corresponding to a specific register set has occurred. For example, one of TIMEOUT0-TIMEOUTn will be asserted for each timeout encountered. By using the transaction identifier associated with the register of the asserted timeout signal, bridge module 114 can determine which request has timed out and take appropriate actions. A specific implementation of timeouts can be better understood with reference to the flow diagrams of FIGS. 4-9.

Figure 4:
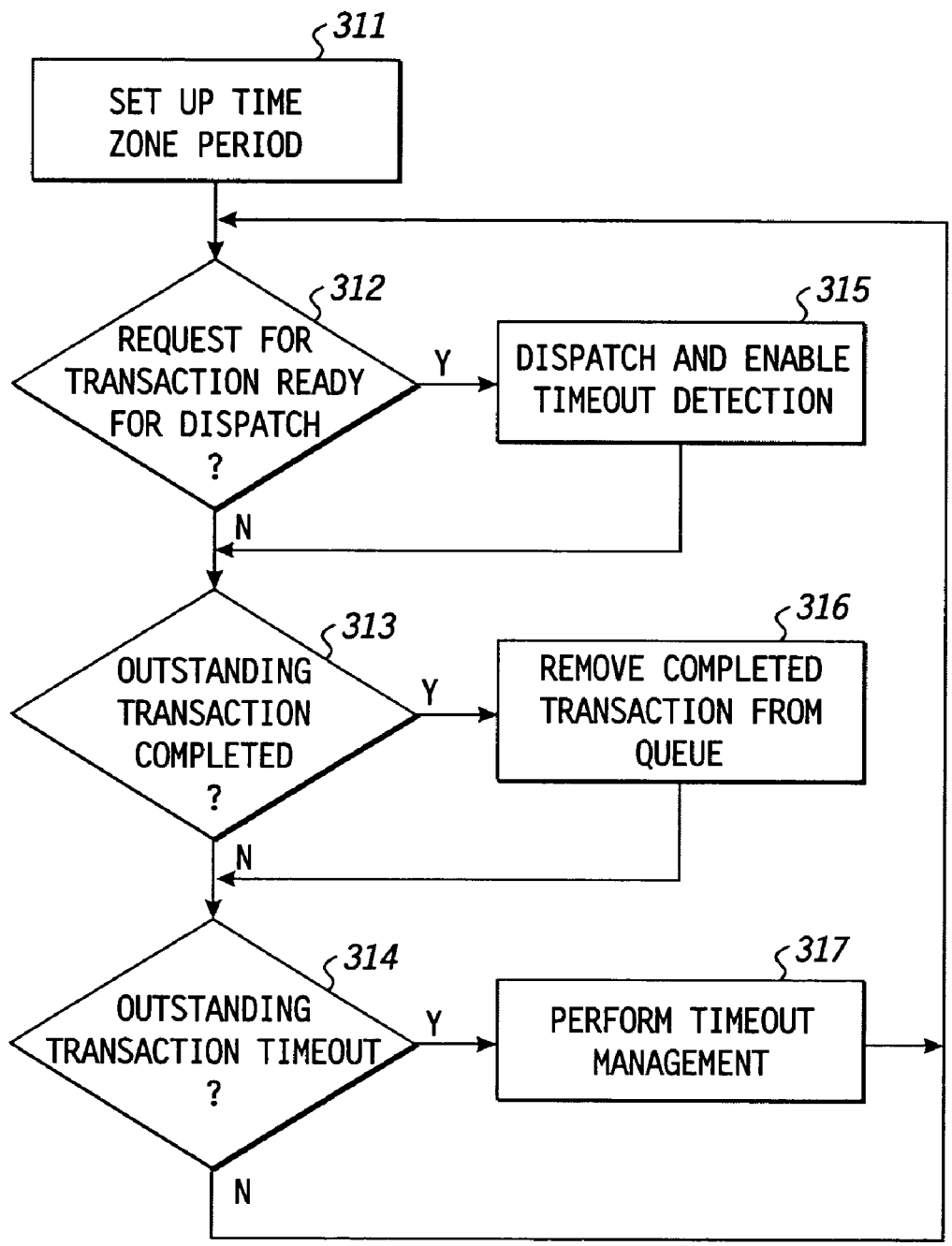

FIG. 4 illustrates a method in flow diagram form that includes decision blocks 312-314, and action blocks 311 and 315-317. The time zone period (TZP) is set up at step 311. In one embodiment, as further discussed with reference to the method of FIG. 5, the time zone period is based upon a maximum timeout period divided by a number of time zones as defined by the total possible number of time zones. Alternatively, when sufficient number of time zones exist, the time zone period can be selected based upon a greatest common denominator of two or more timeout periods. For example, if a system needs to detect timeout periods of 30 ms and 18 ms, the time zone period can be set to 6 ms, provided at least 5 time zones are available. Step 311 will typically occur once after system reset.

At step 312 a determination is made whether a transaction response or request is ready for dispatch to the link 150. If not, flow proceeds to step 313, otherwise flow proceeds to step 315 before transitioning to step 313. At step 315, ready transactions are dispatched and timeout detection is enabled as further described with respect to the methods of FIGS. 6 and 7.

At step 313, a determination is made whether an outstanding transaction response or request has completed. If not, flow proceeds to step 314, otherwise flow proceeds to step 316 before transitioning to step 314. At step 316, completed transactions are removed from the outstanding transaction queue. For example, the enable indicator (EN) can be negated upon completion of a request, thereby indicating its availability for a next transaction.

Figure 8:
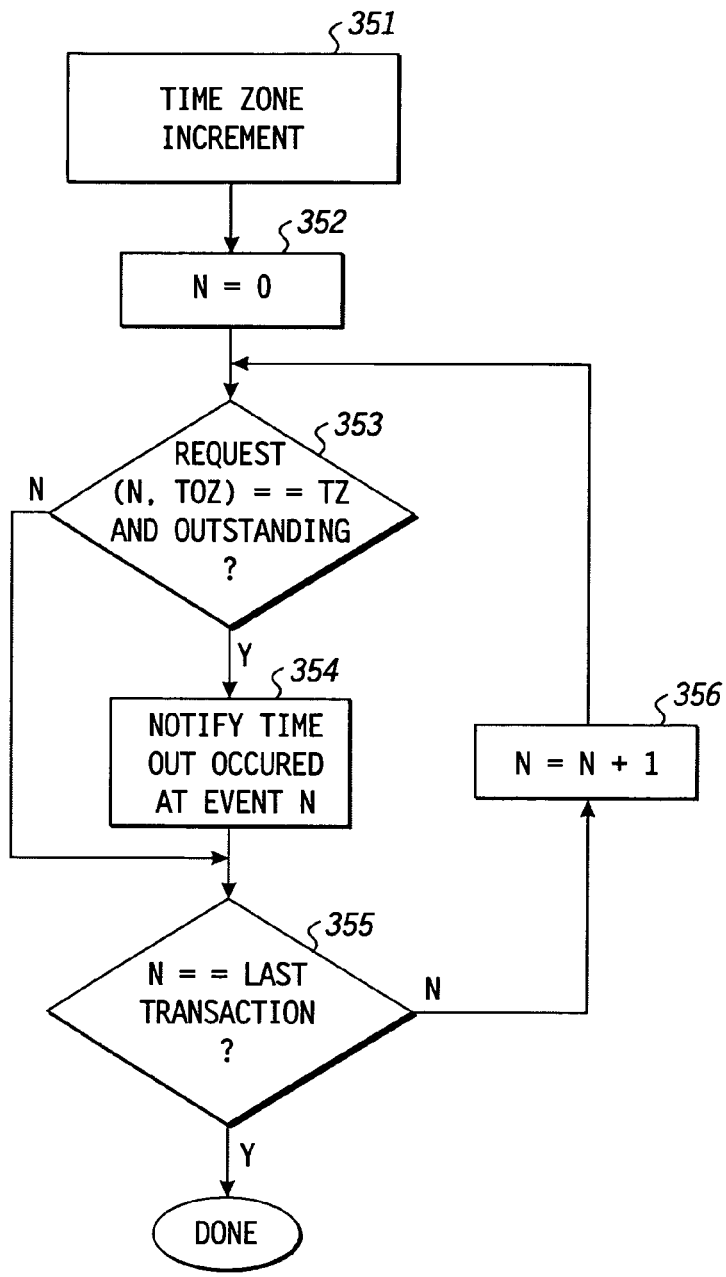

At step 314, a determination is made whether an outstanding transaction response or request has timed-out, as further described by the method of FIG. 8. If not, flow returns to step 312, otherwise flow proceeds to step 317 where timeout management operations are performed as further described by the method of FIG. 9 before transitioning to step 312.

Referring back to step 311, a time zone period (TZP) is determined and set up to facilitate proper time zone incrementing. FIG. 5 is a flow diagram of a method providing greater detail for step 311. At step 321 of FIG. 5 a maximum timeout period (TOP_MAX) is determined. Typically, the maximum timeout period will be identified by a system designer based upon a timeout requirement of connective devices, for example devices connected to PCI Express® link

150. For example, for PCI Express® allows for a maximum timeout of between 10 and 50 ms. For purposes of discussion, it will be presumed that the maximum timeout of requests and responses over link 150 of system 100 is 40 ms as determined by one of both of devices 141 and 142. Note that in alternate embodiments the maximum timeout request can vary depending upon connected peripherals.

At step 322, the period of each time zone (TZP) is defined to be the maximum timeout period (TOP_MAX) divided by the number of time zones (NUM_TZP). For example, for NUM_TZP equal to 8, the time zone period will be 40 ms/8 time zones, or 5 ms/time zones. The time zone period is stored in location 262, as a corresponding number of system clock cycles, to control the period between asserted pulses on signal TZ_INC, which allows time zone counter 251 to increment the time zone (TZ) once per time zone period (TZP), as indicated at step 323. Note in other embodiments the time zone period can be determined by dividing TOP_MAX by a number less than NUM_TZP. For example, TZP=TOP_MAX/(NUM_TZP−1).

Referring to step 315, transactions are dispatched and enabled as illustrated in the flow diagram of FIG. 6. At step 331 of FIG. 6, ready transactions are dispatched for transmission over PCI Express® link 150. Note, that in alternate embodiments a transaction request that is ready for dispatch may be delayed for one or more reasons such as to allow dispatching of other transaction requests.

At step 332, a timeout zone is stored to indicate a time zone by which the dispatched transaction needs to complete to avoid a timeout condition. A specific embodiment for determining a timeout zone for a transaction is illustrated by the flow diagram FIG. 7.

At step 341 of FIG. 7 a determination is made whether the dispatched transaction has a timeout period that is less than or equal to the maximum timeout period (TOP_MAX) as determined at step 311. If so, flow proceeds to step 342 for a timeout zone to be determined, otherwise flow proceeds to step 343 where the time zone period (TZP) and any timeout zones (TOZ) for outstanding transactions are recalculated as previously discussed before determining a timeout zone for a newly dispatched transaction. Referring to step 342, one way to determine the timeout period for a specific transaction is to determine the period based upon the transaction type stored within the register sets described in reference FIG. 3. For example, a transaction type may be based upon a target device requirement, a source device requirement, transaction attributes, such as priority, or a whether a transaction is a request or response.

At step 342, a timeout zone for a new transaction is determined by calculating a future time zone that corresponds to a timeout period for the transaction. One method of calculating the timeout zone corresponding to the timeout period is to divide the desired timeout period for a pending transaction N (REQUEST[N,TOP]) by the time zone period (TZP). In one embodiment, the length of the timeout period of a pending transaction is associated with its transaction type. The resulting value can be rounded or truncated as represented by the function "F[ ]" of step 342 before being added to the current time zone TZ. For example, if a request has a timeout period of 40 ms, i.e., the maximum timeout period, the resulting timeout value can be specified by Trunc[40 ms/5 ms]30TZ, which is equal to 8.

Therefore, if the current time zone is time zone 1, the timeout zone for the transaction being dispatched will be time zone 1 incremented 8 times, time zone 1+8 using modulo 8 addition. Referring to the signal labeled REQ_A TOZ in FIG. 2, the timeout zone of REQ_A is illustrated to have a hexadecimal value of 0×1 at a time substantially simultaneous with the request being dispatched as indicated by signal REQ_A DISPATCH.

It will be appreciated, that other embodiments of determining timeout zones can be implemented. For example, a fixed number of time zone increments can be associated with a transaction type that is to be added to a current time zone to calculate the timeout zone for a particular transaction. For example, a request of a specific type can result in adding five time zones to the current time zone to calculate its timeout zone. Note the ability to add a fixed number of time zones to a current time zone require a priori knowledge of the time zone periods. In an alternate embodiment, a specific type transaction can add a number representative of a specific percentage of available time zones to the current time zone. For example, a specific transaction type can always result in the timeout zone being incremented by an amount equal to one half of the total time zones.

Referring back to FIG. 6, at step 333, the timeout check is enabled once the timeout zone is identified. Note that in accordance with a specific embodiment, all outstanding transactions are checked for a timeout condition at each time zone transition, and that newly dispatched requests are not immediately enabled, i.e., identified as outstanding, until after the timeout checks for a current time zone are performed to prevent a transaction from timing-out in less than one time zone period (TZP). One way to enable timeout checks for newly dispatched requests is to identify requests as outstanding, i.e., assert EN, at the next pulse on signal TZ_INC, and before any timeout checking of the new time zone.

In one embodiment, transactions can be identified as enabled within the same time zone from which they are dispatched provided the maximum timeout time is represented by fewer than all timeout zones. For example, if the maximum timeout is defined to be seven time zones, instead of eight, a timeout zone can be specified for any transaction at any time of dispatch without being concerned that the transaction will timeout in its dispatch time zone. For example, by adding seven different times zone which would result in the timeout zone of the transaction not overlapping with the current time zone.

At step 314, a determination is made whether any timeout conditions have occurred with respect to one or more outstanding transactions as further illustrated in FIG. 8. FIG. 8 illustrates a flow diagram of a method that checks a plurality of transaction registers for transaction that have timeout. For example, one outstanding transaction can be tracked for each of the register sets 271-273 illustrated in FIG. 3. Therefore each register is analyzed by the method of FIG. 8.

Flow proceeds from step 351 to step 352 of FIG. 8 when a time zone increment, e.g. a transaction from time zone 1 to time zone 2 is detected. At step 352, a variable N is set equal to zero (0) corresponding to a first register set. At step 353, a determination is made whether an outstanding request is associated with the first register set, and whether the timeout zone (TOZ) of the first register set is equal to the current time zone (TZ). If so, a timeout condition exists and flow proceeds to step 354, where notification of the timeout occurs, otherwise, flow proceeds to step 355.

At step 355, a determination is made whether N represents the last available transaction register. If so, the flow of FIG. 8 is finished, otherwise, the value of N is incremented at step 356 before returning to step 353 to evaluate the next register set.

Returning to FIG. 4, flow proceeds to step 317 when one or more timeout conditions are detected at step 314. Step 317 implements timeout management operations as appropriate.

Figure 9:
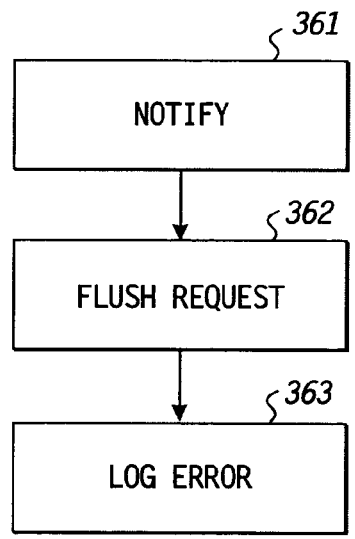

In one embodiment, as illustrated in FIG. 9, timeout management includes providing notice of the timeout at step 361 to the requesting or responding device associated with the timeout condition, so that the device can manage the timeout condition. At 362, the transaction associated with the timeout condition is flushed from bridge module 114. At step 363, a log of the timeout condition is made. Note that it will be appreciated that many different embodiments of timeout management can be performed. For example, a timeout condition can result in a request or response being re-dispatched one or more times.

It will be appreciated, that the method of FIGS. 4-9 can be used to implement timeouts as described herein. In addition, it will be appreciated that many various can be implemented. For example, referring to FIG. 2 a request REQ_B is ready for dispatch at approximately the same time that REQ_A was ready for dispatch. However, instead of being dispatched at substantially the same time as REQ_A, the dispatch of REQ_B was delayed to be synchronous with a time zone transition, i.e. the beginning of time zone 2 at time T2. In specific embodiments, delaying dispatch of a transaction until a known point in the time zone cycle allows a determinate timeout period to be obtained.

Figure 10:
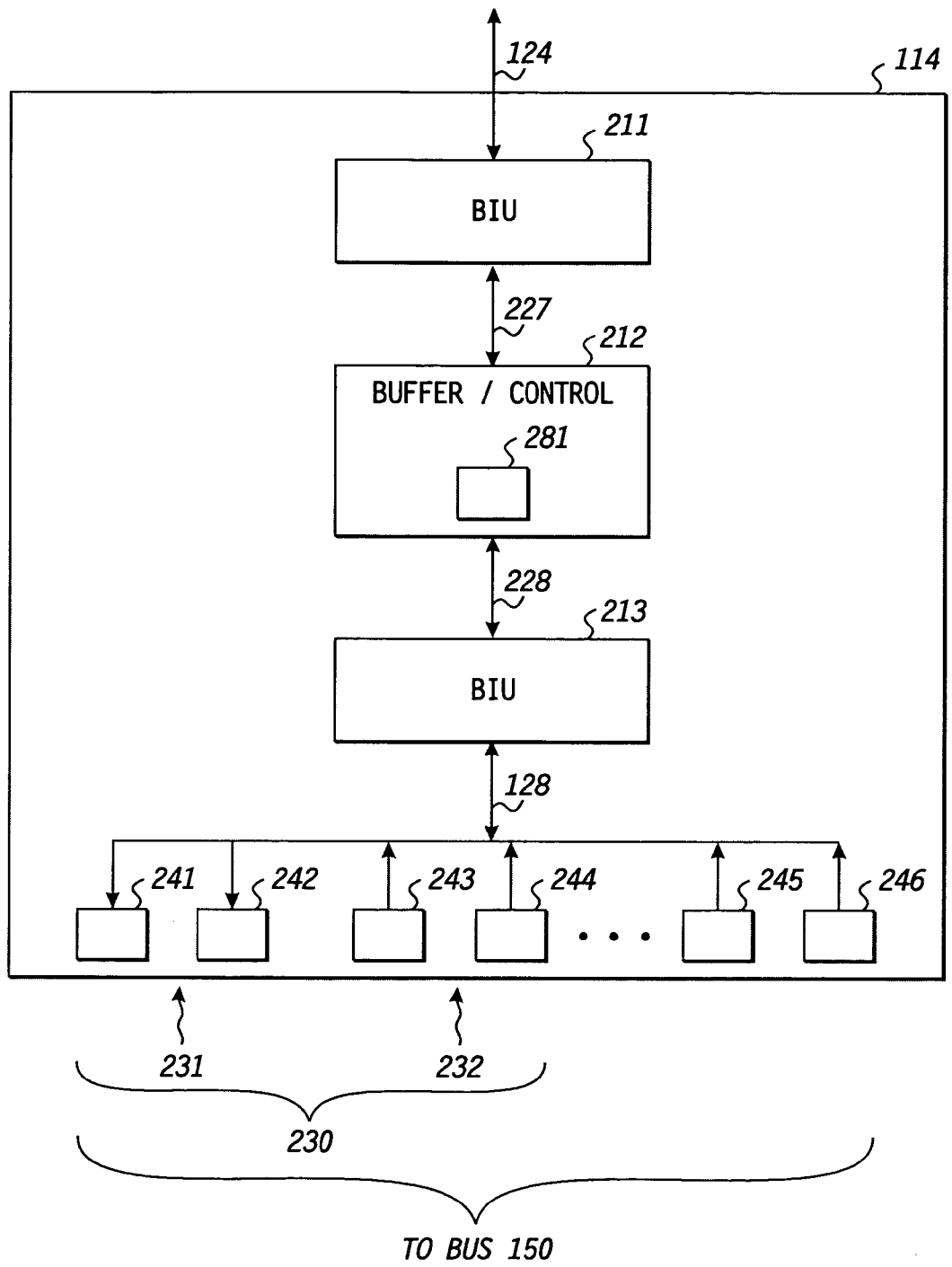
FIG. 10 illustrates a block diagram providing greater detail of a portion of the system of FIG. 1.

FIG. 10 illustrates a block diagram of bridge module 114 of FIG. 1 in greater detail. Specifically, module 114 includes an interface module 212 that is connected to a bus Interface Unit (BIU) 211 through connection 227 and to BIU 213 through connection 228.

In operation, BIU 211 acts as a simple bridge between bus 124 and the intra-module 114 connections 227, while BIU 213 acts as a bridge between the intra-module 114 connections 228 and bus 150. The information received at BIU 211 from interface 130 over bus 124 is provided to interface module 212, which provides buffering and control as necessary before providing the information to BIU 213 for transmission over the bus 150. In the described embodiment BIU 213 is responsible for transmitting raw information received from buffer/control module 212 over bus 150 in a manner compliant with the PCI Express® standard. Consistent with the PCI Express® standard, the set of bond pads 241-246 represents a PCI Express® link having a plurality of data lanes, including data lane 230 that includes transmit data lane 231 and receive data lane 232. It will be appreciated that each data lane is implemented in a point-to-point configuration using four bond pads to accommodate the transmission and reception of differential-paired signals.

Because the PCI Express® standard supports multiple outstanding requests, the module 212 can receive and initiate multiple outstanding requests. For example, raw information provided by buffer/control module 212 can represents multiple outstanding requests by one or more of the modules within device 110 which in turn are provided to BUI 213 for transmission over the PCI Express® bus 150 such that there are multiple outstanding requests.

In accordance with a specific embodiment of the present disclosure, buffer/control module 212 can have a modular layout or definition to facilitate its use with different BIUs. For example, buffer/control module 212 can be used with a BIU different that BIU 213. For example, the design of module 212 can be reused within module 116 of FIG. 1 to facilitate implementing a bridge between device 110 and bus 155, which can represent a bus other than a PCI Express® bus.

Figure 11:
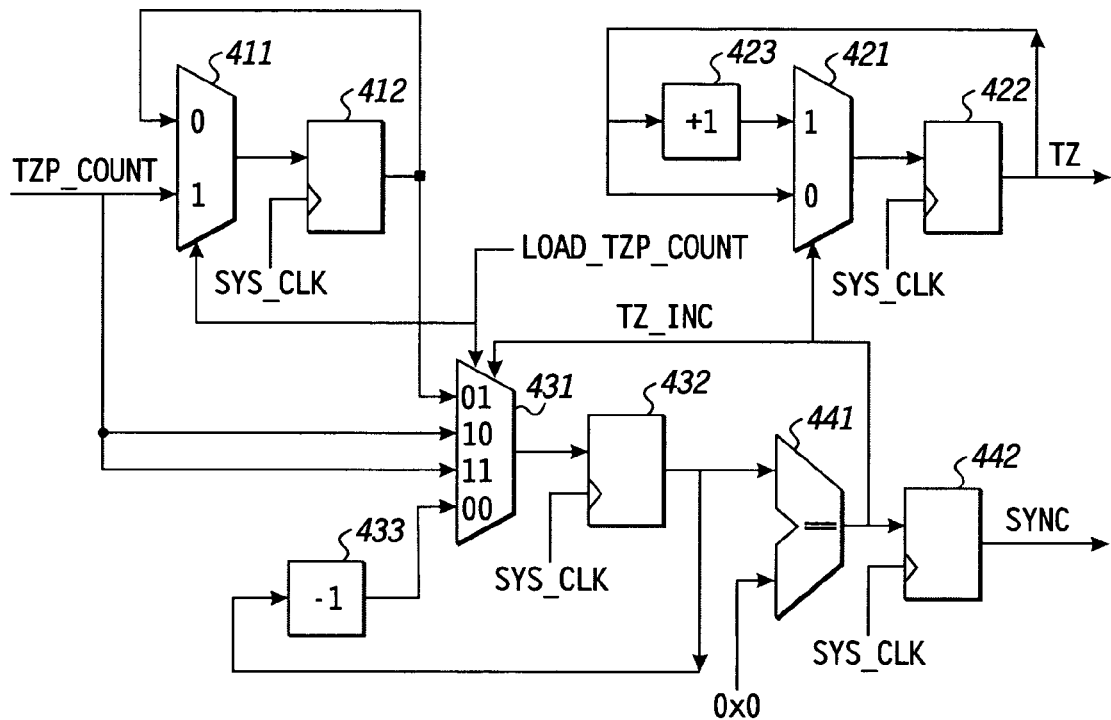
FIG. 11 illustrates a block and circuit diagram of a portion of a timeout module in accordance with the present disclosure.

FIG. 11 illustrates a specific implementation for control logic of module 281 of FIG. 3 used to maintain a current time zone. Included in FIG. 11 are multiplexers 411, 421, and 431, latches 412, 422, 432, and 442, arithmetic modules 423 and 433, and comparator 441.

Multiplexer 411 includes a first input to receive a signal labeled TZP_COUNT, a second input, a select input, and an output. Latch 412 includes a clock input connected to receive a system clock, a data input connected to the output of multiplexer 411, and an output. Multiplexer 431 includes a first input connected to received signal TZP_COUNT, a second input connected to the output of latch 412, a third input, a fourth input connected to receive signal TZP_COUNT, a first select input connected to receive signal LOAD_TZP_COUNT, a second select input, and an output. Latch 432 includes a clock input connected to the system clock, a data input connected to the output of multiplexer 431, and an output. Arithmetic module 433 includes a first input connected to the output of latch 432, and an output connected to the third input of multiplexer 431. Comparator 441 includes a first input connected to the output of latch 432, a second input connected to receive a predefined input value, and an output connected to the second select input of Multiplexer 431. Latch 442 includes a clock input to the system clock, a data input connected to the output of the comparator 441 and an output to provide a synchronization signal labeled (SYNC). Multiplexer 421 include a select input connected to the output of the comparator 441, a first input, a second input, and an output. Latch 422 includes a clock input connected to the system clock, a data input connected to the output of multiplexer 421, and an output connected to the second input of multiplexer 421. Arithmetic module 423 includes a first input connected to the output of latch 422, and an output connected to the first input of multiplexer 421.

In operation the signal labeled TZP_COUNT provides a count value that is representative of the time zone period (TZP) to input '0' of multiplexer 411 and inputs "10" and "11" of multiplexer 431. The count provided by TZP_COUNT is provided to latches 412 and 432 when signal LOAD_TZP_COUNT is asserted, allowing the count to be latched by the system clock. The count is stored at latches 412 and 432 in response to a latching event by the system clock.

Once the count is stored in latch 432, negation of LOAD_TZP_COUNT allows input "00" of multiplexer 431 to be selected. When input "00" is selected, arithmetic module 433 provide a decremented value of the value at latch 432 to the input of latch 432 through multiplexer input "00" for storage at latch 432 during the next system clock cycle. The count stored at latch 432 continues to be decremented in this manner until it reaches a value that is equal to the predetermined value provided to the second input of the comparator 441.

The output of comparator 441 is asserted when the value stored at latch 432 is equal the predetermined value, e.g. 0×0, at the compare input of latch 441. In response the count stored in latch 412 will be stored at latch 432, and the input "1" of multiplexor 421 will be selected to allow the time zone stored at latch 422 to be incremented by arithmetic module 423. The signal labeled SYNC is provided to the system to indicate when a time zone transition is occurring.

Note that not all of the activities described above in the general description or the examples are required, that a portion of a specific activity may not be required, and that one or more further activities may be performed in addition to those described. Still further, the order in which activities are listed are not necessarily the order in which they are performed. After reading this specification, skilled artisans will be capable of determining what activities can be used for their specific needs or desires.

In the foregoing specification, principles of the disclosure have been described above in connection with specific embodiments. However, one of ordinary skill in the art appreciates that one or more modifications or one or more other changes can be made to any one or more of the embodiments without departing from the scope of the invention as set forth in the claims below. Accordingly, the specification and figures are to be regarded in an illustrative rather than a restrictive sense and any and all such modifications and other changes are intended to be included within the scope of invention.

Any one or more benefits, one or more other advantages, one or more solutions to one or more problems, or any combination thereof have been described above with regard to one or more specific embodiments. However, the benefit(s), advantage(s), solution(s) to problem(s), or any element(s) that may cause any benefit, advantage, or solution to occur or become more pronounced is not to be construed as a critical, required, or essential feature or element of any or all the claims.

What is claimed is:

1. A method comprising:
   determining a first timeout time for a first new transaction is greater than a current maximum timeout time, where first information is to be communicated between devices during the first new transaction;
   in response to determining the first timeout time is greater than a current maximum timeout time, determining a time period based upon the first timeout time, wherein the time period is the duration of each one of a plurality of time zones, and where a new maximum timeout time is based upon the duration of the plurality of time zones;
   updating a timeout zone associated with a first outstanding transactions, where second information is to be communicated between devices during the first outstanding transaction, where the undated timeout zone associated with the first outstanding transaction indicates a time zone of the plurality of time zones at which the first outstanding transaction will timeout if not completed;
   associating a timeout zone with the first new transaction, the timeout zone associated with the first new transaction indicating a time zone of the plurality of time zones at which the first new transaction will timeout if not completed; and
   updating a current time zone every time period.

2. The method of claim 1, wherein determining the time period further comprises determining the time period to be approximately equal to the first timeout time divided by a predetermined number of time zones.

3. The method of claim 2, wherein a total number of time zones is fixed and the predefined number of time zones is equal to the total number of time zones.

4. The method of claim 3, wherein the total number of time zones is one of either eight or sixteen.

5. The method of claim 1 further comprising:
   determining a second timeout time that is different and less than the first timeout time, and wherein
   determining the time period further comprises determining the time period to be approximately equal to a greatest common denominator of the first and second timeout times.

6. The method of claim 1, further comprising:
   dispatching the first new transaction, wherein the first new transaction is a second outstanding transaction subsequent to being dispatched;
   associating a timeout zone to a second new transaction, the timeout zone associated with the second new transaction indicating a time zone of the plurality of time zones at which the second new transaction will timeout if not completed, and wherein the second new transaction and the second outstanding transactions are simultaneously outstanding.

7. The method of claim 6, wherein the first new transaction and the second new transaction are dispatched during the same time zone.

8. The method of claim 6 wherein dispatching the first new transaction further comprises:
   dispatching the first new transaction asynchronously relative to a time zone transition.

9. The method of claim 8 further comprising:
   dispatching the second new transaction in response to a time zone transition.

10. The method of claim 6 wherein dispatching the first new transaction further comprises
    dispatching the first new transaction in response to a time zone transition.

11. The method of claim 6, wherein the updated timeout zone associated with the first outstanding transaction and the timeout zone associated with the second new transaction are the same time zone.

12. The method of claim 6, wherein the updated timeout zone associated with the first outstanding transaction and the timeout zone associated with the second outstanding transaction are different time zones.

13. The method of claim 1 wherein when the first new transaction is of a first transaction type the timeout zone associated with the first new transaction is be associated with a time zone of the first plurality of time zones having a first identifier, and when the first outstanding transaction is of a second transaction type the timeout zone associated with the first new transaction is be associated with a time zone of the first plurality of time zones having a second identifier.

14. The method of claim 13 wherein the first identifier is determined by adding a first predefined value associated with the first transaction type to the current time zone, and the second identifier is determined by adding a second predefined value associated with the second transaction type to the current time zone.

15. A system comprising:
    a first bus interface unit;
    a second bus interface unit;
    a time zone counter comprising an output to provide a time zone indicator, and an input to receive an asserted signal to cause the time zone indicator to increments, wherein the time zone indicator is represented by one of three-bits or four-bits;
    a first register set comprising an enable output and a timeout zone output;
    a first comparator coupled to the timeout zone output of the first register set, and an output to provide a first timeout indicator;
    a second register set comprising an enable output and a timeout zone output;
    a second comparator coupled to the timeout zone output of the second register set, and an output to provide a second timeout indicator;
    a control module coupled to the first register assert the enable signal of the first register in response to a first transaction being issued, and to negate the enable signal of the first register in response to the first transaction being successfully completed; and
    a timeout control module having a first input coupled to the output of the first comparator, a second input coupled to the enable output of the first register set, wherein the timeout control module is to perform timeout actions in response to an asserted signal being received at the first input when an asserted signal is being received at the second input.

16. A method comprising:

changing a current time zone periodically based upon a first time period to a next predefined time zone of a plurality of time zones in a modulo manner to maintain the current time zone for a first electronic device;

dispatching a plurality of transaction requests to access information from one or more electronic devices, wherein the plurality of transaction requests are outstanding simultaneously; and associating each one of the plurality of transaction requests with a corresponding time zone of the plurality of time zones, wherein a time zone associated with a specific transaction request of the plurality of transaction requests is indicative of when a timeout condition is scheduled to occur for the specific transaction request;

in response to determining a timeout time of a transaction request is greater than a current maximum timeout time that can be represented by the first plurality of time zones based upon the first time period, changing the current time zone periodically based upon a second time period.

17. The method of claim 16 further comprising:

notifying a requesting device of a timeout condition in response to one of the plurality of transactions associated with the requesting device timing out.

18. The method of claim 17 further comprising:

determining if a timeout condition has occurred in response to the current time zone transitioning.

19. The method of claim 18, wherein a time that the time zone changes periodically is based upon a maximum timeout period and a number of the plurality of time zones.

* * * * *